United States Patent
Rivoalen et al.

(10) Patent No.: US 11,805,290 B2
(45) Date of Patent: Oct. 31, 2023

(54) METHOD FOR MANAGING ZAPPING OF DIGITAL MULTIMEDIA CONTENTS OBTAINED BY HTTP ADAPTIVE STREAMING (HAS), AND CORRESPONDING MANAGEMENT DEVICE, MULTIMEDIA STREAM READER AND COMPUTER PROGRAM

(71) Applicant: Orange, Issy-les-Moulineaux (FR)

(72) Inventors: Mathieu Rivoalen, Chatillon (FR); Hervé Marchand, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/774,413

(22) PCT Filed: Nov. 4, 2020

(86) PCT No.: PCT/FR2020/051992
§ 371 (c)(1),
(2) Date: May 4, 2022

(87) PCT Pub. No.: WO2021/089942
PCT Pub. Date: May 14, 2021

(65) Prior Publication Data
US 2022/0377396 A1 Nov. 24, 2022

(30) Foreign Application Priority Data
Nov. 5, 2019 (FR) ...................... 1912374

(51) Int. Cl.
*H04N 21/2662* (2011.01)
*H04N 21/647* (2011.01)
*H04N 21/845* (2011.01)

(52) U.S. Cl.
CPC ... *H04N 21/2662* (2013.01); *H04N 21/64769* (2013.01); *H04N 21/8456* (2013.01)

(58) Field of Classification Search
CPC ....................... H04N 21/2662; H04N 21/4384
See application file for complete search history.

(56) References Cited

U.S. PATENT DOCUMENTS

2011/0082924 A1 4/2011 Gopalakrishnan
2013/0293787 A1* 11/2013 Van Wallendael ..........................
H04N 21/6405
348/731

(Continued)

FOREIGN PATENT DOCUMENTS

CN 107 659 601 A 2/2018
EP 2 819 424 A1 12/2014
(Continued)

OTHER PUBLICATIONS

Siebert et al. Analysis and Improvements of Zapping Times in IPTV Systems. Jun. 2009. IEEE Transactions on Broadcasting, vol. 55, No. 2. (Year: 2009).*

(Continued)

*Primary Examiner* — Bryan Y Lee
(74) *Attorney, Agent, or Firm* — Knobbe, Martens, Olson & Bear, LLP

(57) ABSTRACT

A method for managing zapping from a first digital content to a second digital content is disclosed. The first and second digital contents are obtained by HTTP adaptive streaming by a multimedia stream reader terminal and are each associated with a description file comprising a list of time segments of the content, each time segment being associated with multiple encoding rates of the content. The zapping management method involves: receiving a request to zap from the first digital content to the second digital content; obtaining the description file of the second digital content; selecting a rate for encoding a first time segment of the second digital content to be downloaded, on the basis of a resource constraint obtained by the multimedia stream reader termi- (Continued)

nal and on the basis of a target zapping time; and downloading the first time segment of the second digital content at the selected rate.

10 Claims, 3 Drawing Sheets

(56) References Cited

U.S. PATENT DOCUMENTS

| | | |
|---|---|---|
| 2014/0026052 A1* | 1/2014 | Thorwirth ............. H04L 65/611 |
| | | 715/721 |
| 2016/0080783 A1 | 3/2016 | Yamagishi |
| 2016/0150273 A1* | 5/2016 | Yamagishi ......... H04N 21/4384 |
| | | 725/109 |
| 2018/0027039 A1 | 1/2018 | Moorthy |

FOREIGN PATENT DOCUMENTS

| | | |
|---|---|---|
| FR | 3 019 428 A1 | 10/2015 |
| FR | 3 022 426 A1 | 12/2018 |
| WO | WO 2018/142947 A1 | 8/2018 |

OTHER PUBLICATIONS

Ramos. Mitigating IPTV Zapping Delay. LaSIGE/FCUL, University of Lisbon. IEEE. (Year: 2013).*
International Search Report for International Application No. PCT/FR2020/051992 dated Mar. 10, 2021.

* cited by examiner

METHOD FOR MANAGING ZAPPING OF DIGITAL MULTIMEDIA CONTENTS OBTAINED BY HTTP ADAPTIVE STREAMING (HAS), AND CORRESPONDING MANAGEMENT DEVICE, MULTIMEDIA STREAM READER AND COMPUTER PROGRAM

CROSS-REFERENCE TO RELATED APPLICATIONS

This application is filed under 35 U.S.C. § 371 as the U.S. National Phase of Application No. PCT/FR2020/051992 entitled "METHOD FOR MANAGING ZAPPING OF DIGITAL MULTIMEDIA CON TENTS OBTAINED BY HTTP ADAPTIVE STREAMING (HAS), AND CORRESPONDING MANAGEMENT DEVICE, MULTIMEDIA STREAM READER AND COMPUTER PROGRAM" and filed Nov. 4, 2020, and which claims priority to FR 1912374 filed Nov. 5, 2019, each of which is incorporated by reference in its entirety.

BACKGROUND

Field

The field of the development is that of digital multimedia contents, namely digital audio and/or video contents, and more particularly the digital multimedia contents obtained according to a technique called HTTP adaptive streaming (HAS) in a local communication network, such as a home network.

More precisely, the development relates to the optimization of the zapping from one digital multimedia content to another, that is to say of the abandoning of the consumption of a first digital multimedia content to switch to a second digital multimedia content, in a multimedia stream reader terminal.

Description of the Related Technology

Access to a digital multimedia content, such as television or video on demand, from a network of the Internet type, is possible today, for most client terminals, in particular when they belong to a local communication network, such as a home network.

The terminal generally emits a request to a server, while indicating the chosen content, and it receives in return a stream of digital data relative to this content. In the context of a local communication network, such a request transits through the gateway for access to the network, for example the residential gateway.

The terminal is adapted to receive these digital contents in the form of multimedia data and to carry out a rendering thereof. This rendering involves providing in the terminal the digital content in a form accessible to the user. For example, received data corresponding to a video is generally decoded, then rendered in the terminal in the form of a display of the corresponding video with its associated soundtrack. Hereinafter, for reasons of simplification, the digital content will be considered as a video and the rendering by the terminal, or consumption by the user of the terminal, will be considered as a viewing or reading on the screen of the terminal.

The broadcasting of digital contents on the Internet is often based on client-server protocols of the HTTP (Hypertext Transfer Protocol) family. In particular, the downloading in progressive mode of digital contents, also called streaming, allows to transport and consume the data in real time, that is to say that the digital data is transmitted on the network and rendered by the terminal as it arrives. The terminal receives and stores a part of the digital data in a buffer memory before rendering it. This mode of distribution is particularly useful when the bitrate available to the user is not guaranteed for the transfer in real time of the video.

HTTP adaptive streaming, abbreviated HAS, further allows to broadcast and receive data according to various qualities corresponding for example to various rates. These various qualities are described in a file of parameters available to download on a data server, for example a content server. When the client terminal desires to access a content, this description file allows to select the correct format for the content to be consumed according to the available bandwidth or the storage and decoding capacities of the client terminal. This type of technique allows in particular to take into account the variations in bandwidth on the link between the client terminal and the content server.

There are several technical solutions for facilitating the distribution of such a content by streaming, for example such as the proprietary solutions Microsoft® Smooth Streaming, Apple® HLS, Adobe® HTTP Dynamic Streaming or the standard MPEG-DASH from the organism ISO/IEC which will be described below. These methods propose addressing to the client one or more intermediate description files, also called documents or manifests, containing the addresses of the various segments at the various qualities of the multimedia content.

Thus, the standard MPEG-DASH (for Dynamic Adaptive Streaming over HTTP) is a standard for a format of audio-visual broadcasting on the Internet. It is based on the preparation of the content in various presentations with variable quality and rate, cut into short segments (approximately several seconds), also called chunks. Each of these segments is made available individually via an exchange protocol. The protocol mainly targeted is the HTTP protocol, but other protocols (for example FTP) can also be used. The organization of the segments and the associated parameters are published in a manifest in the XML format.

The underlying principle of this standard is that the MPEG-DASH client carries out an estimation of the bandwidth available for the reception of the segments, and, according to the filling of its reception buffer, chooses, for the next segment to load, a representation having a rate that:
  ensures the best possible quality
  and allows a reception delay compatible with the uninterrupted rendering of the content.

Thus, to adapt to the variation in the network conditions, in particular in terms of bandwidth, the existing solutions for adaptive downloading allow the client terminal to go from one version of the content encoded at a certain rate to another encoded at another rate, during the download. Indeed, each version of the content is divided into segments having the same duration. To allow a continuous rendering of the content on the terminal, each segment must reach the terminal before its programmed rendering time. The perceived quality associated with a segment increases with the size of the segment, expressed in bits, but at the same time, larger segments require a greater transmission time, and thus have an increased risk of not being received on time for a continuous rendering of the content.

The client terminal must therefore find a compromise between the overall quality of the content and its uninterrupted rendering, by carefully selecting the next segment to download, among the various encoding rates proposed. To do this there are various algorithms for selecting the quality of the content according to the available bandwidth, which can have more or less aggressive, or more or less secure, strategies.

In other words, in order to ensure a certain fluidity during the reading, if the available bandwidth does not allow to access the best quality broadcast, the client terminal will use data streams of lesser quality. This technique thus allows to propose the best possible video quality while guaranteeing fluid reading or viewing of the digital content.

The consumption of digital contents via HTTP adaptive streaming (HAS) is becoming more widespread. It is in particular used by numerous streaming services, but also by certain set top boxes, which use it to access delinearized contents, such as video on demand (VOD), the delayed broadcasting of television programs (replay), or the offers of the Network PVR (for Network Personal Video Recorder, i.e. a service for recording digital contents, carried out by the content provider itself rather than in the home of the final user) type.

Moreover, other devices such as multimedia stream reader apparatuses in real time also access digital contents in HTTP adaptive streaming mode for television contents in real time (or LIVE). This is the case for example for the Chromecast® apparatus developed by Google®, or for the Clé TV® of Orange®. Such apparatuses are conventionally plugged into the HDMI port of a television and communicate, by Wi-Fi® connection, with another apparatus of the home communication network connected to a wide area communication network of the Internet type (residential gateway, computer, smartphone, tablet . . . ), in order to render, on the television, the multimedia content received by a compatible software application. These apparatuses will be designated hereinafter by the generic designation HDMI Key.

Hereinafter, for reasons of simplification, the term "client terminal" will be considered as the association of a multimedia stream reader terminal (for example HDMI Key) and of a rendering terminal (for example a television) allowing to view the content. It is noted that the rendering terminal can be the multimedia stream reader terminal itself (for example a smartphone, a tablet) or be distinct from the latter (for example a television connected to an HDMI Key, or to a set top box (STB)).

When a user uses the services of such digital content servers, they may desire to rapidly go from one digital content to another: this is called zapping.

Indeed, zapping means the fact that the user abandons the consumption of one digital multimedia content (for example a first program, or a first television channel) to switch to another digital multimedia content (for example another program or another channel) in a rapid manner.

In the present application, the term "zapping" is extended to any change from digital multimedia content obtained by HAS to another. In a first example, this can be from a digital multimedia content broadcast LIVE (in real time) to another, for example such as from one television channel to another. In a second example, this can be from one digital multimedia content of the VOD type to another, for example such as from one episode of a series to another episode of this same series. This can also involve the passage from a real-time content to a delayed content, for example from a LIVE television program to a delayed program of the replay type, or to a video on demand.

In this context of HAS HTTP adaptive streaming, the time of zapping from one digital multimedia content to another, on the multimedia stream reader terminals, for example such as an HDMI Key, varies a lot according to the network environment, that is to say the type of access to the communication network of the user (for example ADSL (for Asymmetric Digital Subscriber Line); VDSL (for Very high-speed digital subscriber line); or fiber), the bandwidth at the time of the zapping, the availability of the content server, but also according to the digital multimedia content that the user desired to access.

Conventionally, during the switching from the rendering of a first to a second digital content during a zapping in HAS, the fragments of the second content are downloaded at the same encoding rate as those of the first content.

For some users with a good network environment (for example if they have fiber), the time needed to switch from the rendering of one digital content to another, or zapping time, can be acceptable, but for others, it can be very long (more than 5 seconds in some cases). However, it is important for this zapping time to remain short to not bother the user and guarantee a good quality of experience.

There is already a solution implemented by the multimedia stream reader terminals to reduce the zapping time in a global and undifferentiated manner for all the users.

This solution is based on the retrieval of low-quality time segments during the zapping phases. Thus, the time segments of the new digital multimedia content to be downloaded are downloaded at the lowest rate proposed in the description file of this digital content, regardless of the network constraints, in particular in terms of bandwidth. The shortest possible zapping time is thus ensured, since the downloading and the decoding of the chunks of the new content to be rendered are carried out in a reduced time.

However, this solution, even if it provides a short zapping time, can have a negative effect on the quality of the rendering of the new content. In particular, the users having a satisfactory bandwidth, which could have allowed to download time segments of better quality, are adversely affected. Thus, even if the zapping time is short, the quality of the digital contents is not optimized and the quality of experience of the user is potentially reduced.

A technique is also known, from the patent document EP 2 819 424, in the name of the same applicant as the present patent application, aiming to reduce the zapping time from one content channel to another; this technique is based on the pre-delivery, at a reduced encoding rate, of several content channels to which the user is capable of zapping; this pre-delivery is carried out in parallel to the delivery of the content channel that the user is currently viewing. Moreover, according to the encoding rate of the channel currently being viewed, the remaining rate, according to the available bandwidth, is divided among the various content channels to pre-deliver.

This technique, although of interest, is necessarily based on the pre-delivery of one or more content channels, and can thus turn out to be complex to deploy, and to pointlessly consume resources.

Moreover, it does not allow to optimize the quality of the experience of the user. Indeed, the encoding rate of the first segment of a new content rendered to the user during the zapping corresponds to the encoding rate of this new pre-delivered content; in the case in which several contents are pre-delivered, this encoding rate thus only represents a fraction of the remaining rate, i.e. a fraction of the part of the bandwidth not used to consume the content currently being viewed; in the extreme case in which only one content is pre-delivered, this encoding rate is thus at best equal to this remaining rate.

The quality of the rendering thus remains relatively low, and does not allow to optimize the user experience.

There is therefore a need for a technique for managing the zapping of digital contents, obtained via HTTP adaptive streaming (HAS), which does not have these various disadvantages of the prior art. In particular, there is a need for such a technique that allows to provide a good compromise between on the one hand the zapping quickness and on the other hand the quality of rendering of the digital content during the zapping and thus the quality of experience for the user, by taking advantage in particular of the technical specificities of HTTP adaptive streaming (HAS).

There is also a need for such a technique that allows to eliminate the pre-delivery of content channels to achieve this joint optimization of the zapping time and of the quality of rendering of the content.

SUMMARY

The development satisfies this need by proposing a method for managing zapping from a first to a second digital content. Theses first and second digital contents are obtained by HTTP adaptive streaming (HAS) by a multimedia stream reader terminal, and are respectively associated with a description file, comprising a list of time segments of the content each associated with several encoding rates of the content.

This method for managing zapping comprises:
receiving a request to zap from the first digital content to the second digital content,
obtaining the description file of said second digital content.

According to the development, such a method also comprises:
selecting an encoding rate of a first time segment of the second digital content to be downloaded, according to on the one hand a resource constraint obtained by the multimedia stream reader terminal and on the other hand a target zapping time,
downloading the first time segment of the second digital content at the selected rate.

Thus, the development is based on a novel and inventive approach to the management of the zapping from one content to another, in a context of HTTP adaptive streaming. More particularly, the development proposes taking into account, in addition to the resource constraints of the multimedia stream reader terminal, a target zapping time, allowing to optimize the quality of experience of the user, to choose the quality, or encoding rate, of the first time segment of the new content (or second content) to be downloaded during the zapping.

For this, when the user emits, during the rendering of a first digital content, a command to change content, also called zapping command, the digital multimedia stream reader terminal receives it, and thus elects the encoding rate of the first time segment of the new digital content to be downloaded, then to be rendered, according to the available bandwidth, in such a way that the target zapping time is respected. Indeed, the multimedia stream reader terminal knows the current bandwidth constraints, according to the conventional HAS technique. This target zapping time thus defines a reasonable zapping time limit to not be exceeded in order to propose a pleasant experience to the user.

Jointly taking into account the resource conditions available and this target zapping time allows to improve the user experience by jointly optimizing both the time necessary to switch from the rendering of one content to another and the quality of rendering of the new content.

Thus, the user is not bothered by a zapping time that is too long between the moment at which he emits the zapping command and the moment at which the new content is rendered to him, and can view this new content at the best possible quality according to his bandwidth. In other words, the method according to the development allows to optimize the quality of encoding of the new content to be rendered, to favor the best possible quality of experience, without affecting the zapping time, since the latter is limited by a target zapping time to not be exceeded.

Thus, the method according to the development allows to reach a compromise between a target zapping time that is not too long and a quality of rendering of a new digital content, and provides the user with a better quality of experience during the zapping from one digital content to another.

It is noted that unlike the prior art described in the patent document EP 2 819 424 in the name of the same applicant, the method according to the development advantageously allows to eliminate the pre-delivery of content channels, which can turn out to be complex and pointlessly consume resources. Indeed, the second content is not pre-delivered in parallel to the viewing of the first content by the user, and it is only after reception of a zapping request from the user that, on the one hand, the best encoding rate of the second content that the user can have, given the bandwidth resources available and a maximum zapping time to not be exceeded, is determined, and on the other hand, the downloading of the first segment of this second content, at the optimal encoding rate thus determined, is initiated.

According to a particular aspect of the development, the encoding rate selected corresponds to an encoding rate for which a zapping time from the first to the second content is less than or equal to the target zapping time.

Advantageously, the development intends to not seek to minimize the zapping time for the user but on the contrary be as close as possible to a predefined target zapping time that is identical regardless of the bandwidth and resource conditions of the communication network of the user and of the content server. Thus, the development seeks to optimize the quality of encoding of the first time segment to be downloaded of the new content to be rendered while respecting this target zapping time regardless of the resource constraints. Thus, regardless of the circumstances, the zapping time experienced by the user is always the same: this reproducibility is favorable to the quality of the user experience.

It is noted that zapping time means the time that passes between the emission by the user of a zapping command, and the rendering on the rendering terminal of the new digital content. This zapping time must not exceed a target zapping time, or maximum zapping time.

In one example, this target zapping time is 2 seconds, a value that guarantees a good user experience in terms of waiting time between the emission of the command to change digital content and the rendering on the rendering terminal of the new digital content.

According to another particular aspect of the development, the selection of an encoding rate takes into account a latency necessary for obtaining the description file of the second digital content.

Thus, the zapping time between the moment at which the user requests the change from the first digital content currently being rendered to the second content takes into account an incompressible latency. This latency corresponds to the time that passes between the emission of the command to change content by the user and the obtaining of the description file, or manifest file, of the second content to be downloaded then to be rendered.

Indeed, during a zapping, the multimedia stream reader terminal receives a request to change from a first digital content to a second digital content. This terminal thus sends a request to retrieve the manifest file of the second content to the digital content server then retrieves this manifest file. The corresponding latency is then measured.

More particularly, this latency corresponds to the incompressible time between the moment at which the user requests a change in digital content, via a zapping command, and the retrieval by the terminal of the first bytes of the manifest file of the second digital content. This latency thus depends on the one hand on the bandwidth at the time of the zapping, but also on the time that it takes the content server to send the manifest file of the second content to the multimedia stream reader terminal.

In the manifest file of the second content, several encoding qualities are disclosed and the encoding quality of the first time segment to be downloaded is thus selected such that this quality corresponds to a "target" quality, allowing to best respect the target zapping time according to the bandwidth conditions and the latency.

Thus, taking into account this latency allows to select the best encoding quality of the first time segment of the second digital content to be downloaded allowing to respect the target zapping time.

It is noted that taking into account this latency is an option which is advantageous in this specific case, but which the solutions of the prior art, as described for example in the patent document EP 2 819 424, according to which the content channels to which the user is liable to zap are the object of a pre-delivery, in parallel to the viewing of the first content, can eliminate.

According to one feature of the development, the zapping request belongs to the group comprising:
 a movement in a guide of the digital content programs;
 an input of an identifier of the second digital content on a digital keyboard, the identifier comprising at least one alphanumeric character.

Thus, the user, to zap, emits a zapping command via for example a movement in a digital content program. This movement in the guide of the digital content programs can be carried out for example by pressing the buttons P+ or P− of a remote control or by swiping the touchscreen of a tablet or of a smartphone.

In another example, the zapping command is made more directly via the selection of a digital content by input of the identifier of this second content on a digital keyboard. This identifier can be a sequence of alphanumeric characters for example such as the number of the channel or the number of the episode of a series. This input is carried out for example via the remote control of a television or directly on the touchscreen of a smartphone or of a tablet.

According to another feature of the development, the method comprises a step of parameterizing of the target zapping time by a user via an interface of a rendering terminal.

Thus, the user can select, for example via an interface of a rendering terminal, a target zapping time corresponding to a maximum zapping time predefined by the manufacturer for example, or modify it according to their preferences.

The user can thus prefer a shorter target zapping time and the downloading of time segments of the new content of lesser quality or prefer a longer target zapping time, to favor the selection of time segments at the best quality allowed by the bandwidth constraints.

According to another aspect of the development, the target zapping time depends on a nature of the second digital content.

Thus, it is possible to parameterize several target zapping times, according to the nature of the digital content (for example film, documentary, sport . . . ). In other words, when the user has a particular interest for a content of a particular nature, for example such as a film, they can choose a longer target zapping time in order to ensure that the best content quality is downloaded. On the contrary, when the quality of the content only has little interest for the user (for example television news), they can choose a shorter zapping time to favor the downloading of the content at a low encoding rate. This parameterization can be left to the discretion of the user, or be carried out by the manufacturer of the multimedia stream reader terminal implementing this zapping method.

The development also relates to a computer program product comprising program code instructions for the implementation of a method for managing zapping from a first to a second digital content, as described above, when it is executed by a processor.

The development is also aimed at a recording support readable by a computer on which a computer program comprising program code instructions for the execution of the steps of the method for managing zapping from a first to a second digital content according to the development as described above is recorded.

Such a recording support can be any entity or device capable of storing the program. For example, the support can include a storage medium, such as a ROM, for example a CD-ROM or a ROM of a microelectronic circuit, or a magnetic recording medium, for example a USB key or a hard disk.

Moreover, such a recording support can be a transmittable support such as an electric or optical signal, which can be delivered via an electric or optical cable, by radio or by other means, so that the computer program that it contains can be executed remotely. The program according to the development can be in particular downloaded over a network for example the Internet network.

Alternatively, the recording support can be an integrated circuit into which the program is incorporated, the circuit being adapted to execute or to be used in the execution of the aforementioned method for controlling display.

The development also relates to a device for managing zapping from a first to a second digital content. These first and second digital contents are obtained by HTTP adaptive streaming (HAS) by a multimedia stream reader terminal and are respectively associated with a description file, comprising a list of time segments of the content each associated with several encoding rates of the content.

This device comprises:
 a module for receiving a request to zap from the first digital content to the second digital content,
 a module for obtaining the description file of the second digital content.

This device further comprises:
 a module for selecting an encoding rate of a first time segment of the second digital content to be downloaded, according to on the one hand a resource constraint obtained by the multimedia stream reader terminal and on the other hand a target zapping time,
 a module for downloading the first time segment of the second digital content at the selected rate.

Finally, the development also relates to a multimedia stream reader terminal, comprising a device for managing zapping from a first to a second digital content as described above.

The aforementioned corresponding management device, multimedia stream reader terminal and computer program have at least the same advantages as those conferred by the method for managing zapping from a first to a second digital content according to the various embodiments of the present development.

BRIEF DESCRIPTION OF THE DRAWINGS

Other goals, features and advantages of the development will appear more clearly upon reading the following description, given as a simple illustrative, and non-limiting, example, in relation to the drawings, among which.

DETAILED DESCRIPTION OF CERTAIN ILLUSTRATIVE EMBODIMENTS

The general principle of the development is based on the possibility, during a zapping from one digital content to another, obtained by HAS downloading, of selecting the encoding rate of the first time segment of the new content to be downloaded (also designated hereinafter as the second digital content to be downloaded) while taking into account on the one hand the resource constraints of the multimedia stream reader terminal and on the other hand a target zapping time.

Thus, jointly taking into account the resource conditions available and this target zapping time allows to improve the user experience by jointly optimizing both the time necessary to switch from the rendering of one content to another and the quality of rendering of the new content.

Figure 1:
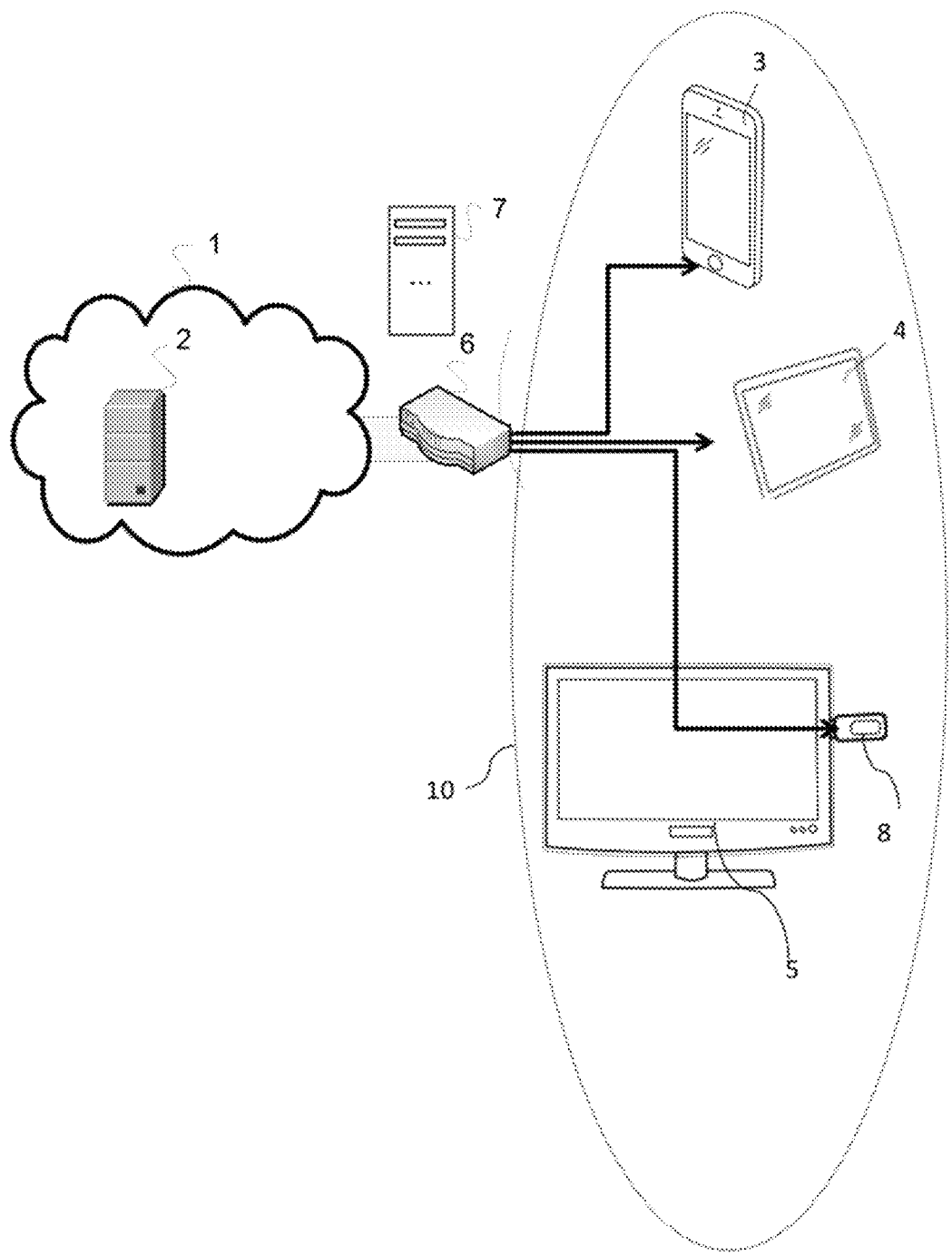
FIG. 1: presents an architecture of streaming over a home network based on the use of the adaptive streaming according to an embodiment of the development.

An architecture of streaming in a home network based on the use of the adaptive streaming according to the development is now presented in relation to FIG. 1.

The terminal 3, for example a smartphone, the terminal 4, for example a tablet, and the terminal 8, for example an HDMI key connected to a television 5, are located, in this example, in a local area network (LAN, 10) controlled by a home gateway 6. The context of the local area network is given as an example and could be easily transposed to another Internet network of the "best effort" type, an enterprise network, etc.

An HAS digital content server 2, or content server 2, is located according to this example in the wide area network (WAN, 1) but it could indifferently be located in the local area network (LAN, 10), for example in the home gateway 6 or any other piece of equipment capable of hosting such a content server. The content server 2 receives for example digital television content channels coming from a broadcast television network, not shown, and makes them available to the client terminals.

The client terminals 3, 4 and the HDMI key 8 in association with the television 5 can enter into communication with the content server 2 to receive one or more contents (films, documentaries, advertising sequences, etc.).

It is frequent, in this client-server context, to use, in order to exchange the data between the terminals 3, 4 and 8 and the content server 2, a technique of HTTP adaptive streaming, abbreviated as HAS, based on the HTTP protocol. This type of technique allows in particular to offer a good quality of contents to the user while taking into account the variations in bandwidth that can occur on the link between the client terminals 3, 4 and 8 and the service gateway 6, or between the latter and the content server 2.

Conventionally, various qualities can be encoded for the same digital content, corresponding for example to various rates. More generally, quality is used to refer to a certain resolution of the digital content (spatial, temporal resolution, level of quality associated with the video and/or audio compression) with a certain rate. Each quality level is itself divided on the content server into time segments (or "fragments" of content, "chunks", these three words being used indifferently throughout this document).

The description of these various qualities and of the associated temporal segmentation, as well as the content fragments, are described for the client terminal and made available to it via their Internet addresses (URI: Universal Resource Identifier). All of these parameters (qualities, addresses of the fragments, etc.) are in general grouped together in a file of parameters, called description file or manifest. It is noted that this file of parameters can be a computer file or a set of descriptive information on the content, accessible at a certain address.

The terminals 3, 4 and 8 have their own characteristics in terms of decoding, display capacity, etc. In a context of HTTP adaptive streaming, they can adapt their requests to receive and decode the content requested by the user at the quality that best corresponds to them. In our example, if the contents are available at the rates 400 kb/s (kilobits per second) (Resolution 1, or level 1, noted as D1), 800 kb/s (D2), 1200 kb/s (D3), 2100 kb/s (D4) and the client terminal has a bandwidth of 3000 kb/s, it can request the content at any rate lower than this limit, for example 2100 kb/s. In general, the segment number i with the quality j (for example the j-th quality level Dj described in the description file) of the content number X is noted as "CXi@Dj".

The service gateway 6 is in this example a home gateway that ensures the routing of the data between the wide area network 1 and the local area network 10 and manages the digital contents by ensuring in particular their reception from the wide area network 1.

The terminals 3, 4 and 8 receive the data coming from the wide area network 1, via the home gateway 6, and ensure its decoding, and optionally its rendering on their screen, or in the example of the HDMI key 8 on the associated television 5. In one alternative, the terminals 3 and 4 transmit this data to the HDMI key 8 for rendering on the screen of the television 5. In another alternative, the decoder can be located elsewhere in the wide 1 or local 10 area network, in particular in an element of the STB (Set Top Box) type (not shown) associated with a television 5.

In this example, to view a content, the terminals 3, 4 or 8 first query the service gateway 6 to obtain an address of the description document 7 of a first desired digital content C1. The service gateway 6 responds by providing to the terminal the address of the description file 7. Hereinafter, it will be supposed that this file is a file of the manifest type according to the standard MPEG-DASH (noted as "C.mpd") and reference will be made indifferently, according to the context, to the expression "description file" or "manifest".

Alternatively, this file can be retrieved directly from an Internet server local or external to the local area network, or already be located on the service gateway or on the terminal at the time of the request.

An example of a manifest file (MPD) compliant with the standard MPEG-DASH and including the description of contents a via in three different qualities (N1=512 kb/s, N2=1024 kb/s, N3=2048 kb/s) of the fragmented contents is presented in Appendix 1. This simplified manifest file describes digital contents in an XML (for Extensible Markup Language) syntax, comprising a list of contents in the form of fragments conventionally described between an opening tag (<SegmentList>) and a closing tag (</SegmentList>). The division into fragments allows in particular to finely adapt to the fluctuations in the bandwidth. Each fragment corresponds to a certain duration ("duration" field) with several quality levels and allows to generate their addresses (URL—Uniform Resource Locator). This generation is carried out in this example using the elements "BaseURL" ("HTTP://server.com") which indicates the address of the content server and "SegmentURL" which lists the complementary parts of the addresses of the various fragments:

"C1_512 kb_1.mp4" for the first fragment of the content "C1" at 512 kilobits per second ("kb") in the MPEG-4 ("mp4") format, "C1_512 kb_2.mp4" for the second fragment, etc.

Once it has the addresses of fragments corresponding to the desired content, the service gateway 6 proceeds to obtaining the fragments via a download at these addresses. It is noted that this download is carried out here, conventionally, through an HTTP URL, but could also be carried out through a universal address (URI) describing another protocol (dvb://mycontentsegment for example).

It is supposed here that the HDMI key 8 is connected to the television 5 by plugging into the HDMI port of the latter, and is used to render, on the screen of the television 5, a content CX (X being an integer representing the X-th content viewed), described in a manifest file 7. It is noted that the content CX can be a television program broadcast live or with a delay (for example such as a film, a series, a television program, an advertising sequence, etc.), or a video on demand, or any other multimedia digital content.

In one example, a user desires to view a multimedia digital content, such as a film, on their television 5 connected to an HDMI Key 8. The HDMI key 8 is connected via Wi-Fi® directly to the residential gateway 6. Alternatively, the HDMI key 8 could also be connected via Wi-Fi® to another mobile peripheral of the home network, for example to the tablet 4 or to the smartphone 3, through which it could access the wide area communication network 1.

The HDMI key 8 can also be controlled by the user via the smartphone 3, on which a software application for controlling the HDMI key 8 is installed.

The content fragments obtained by the residential gateway 6 are for example transmitted via Wi-Fi® to the HDMI key 8, which controls their display on the screen of the television 5, for rendering to the user.

Figure 2:
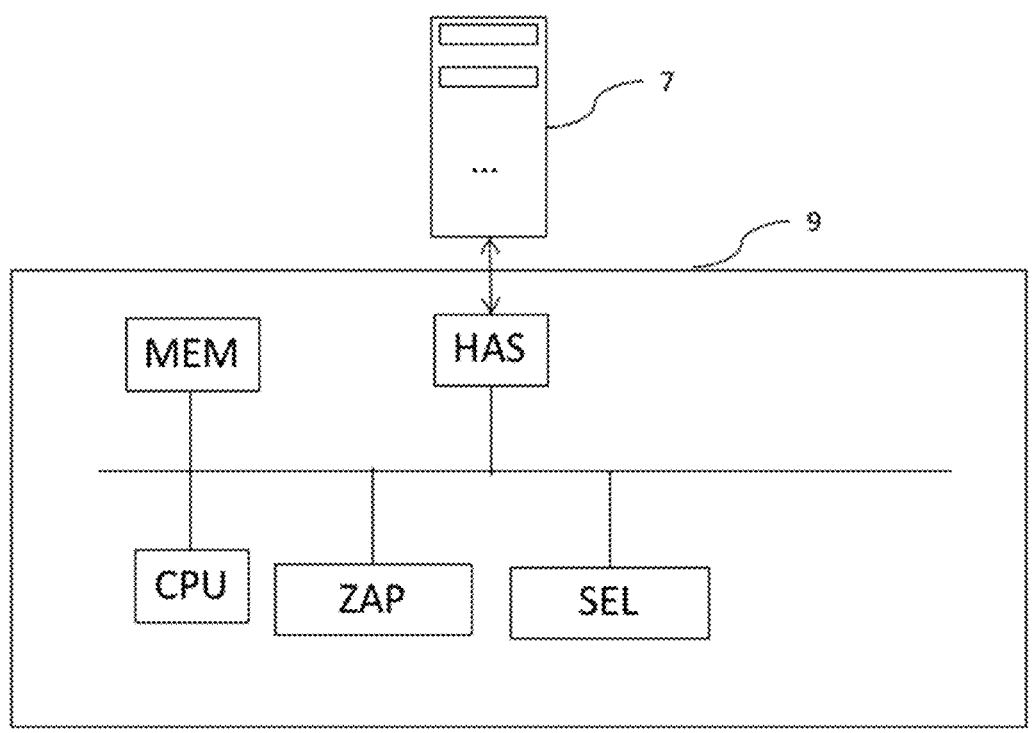
FIG. 2: schematically illustrates the hardware structure of a multimedia stream reader terminal integrating a device for managing zapping according to an embodiment of the development.

FIG. 2 shows an architecture of a multimedia stream reader terminal 9, or stream reader 9, according to an embodiment of the development. This stream reader terminal 9 can be for example the HDMI key 8, or the smartphone 3 of FIG. 1. Alternatively, this stream reader 9 is integrated into an element of the STB type associated with a television (not shown). The example of the HDMI key 8 is described more specifically below.

The stream reader terminal 9 comprises, conventionally, memories MEM associated with a processor CPU. The memories can be of the ROM (for Read-Only Memory) or RAM (for Random-Access Memory) or Flash type. The multimedia stream reader 9 comprises a module for HTTP adaptive streaming HAS, or client module HAS, capable of requesting a streaming of one of the contents at one of the qualities proposed in a description file 7. This description file 7 can be recorded for example in the memories MEM of the multimedia stream reader 9 or be located outside. The obtaining of this manifest file 7, from the content server, is also controlled by the downloading module HAS.

The multimedia stream reader 9 further comprises a zapping module ZAP allowing a user to zap, that is to say to abandon the consumption of one digital content to switch to another quickly. Such a zapping module ZAP is capable of receiving a request to zap from a first to a second digital content when the user emits a zapping command, for example via a remote control associated with the television 5, or by action on an interface of the smartphone 3 or of the tablet 4.

The multimedia stream reader 9 also comprises a module for selecting an encoding rate of the first time segment of a new content to be downloaded SEL, or selection module SEL. During the implementation of a zapping by the zapping module ZAP, the selection module SEL controls the client module HAS, in order to force the latter to request the download of the first time segment of the new content according to on the one hand a resource constraint obtained by the multimedia stream reader terminal 9 and on the other hand a target zapping time. It is noted that it is upon reception of a zapping request that this download is requested, the new content not having been previously pre-delivered, for example in parallel to the first content currently being viewed. In other words, the selection modules SEL and the client module HAS are activated upon reception of a command coming from the zapping module ZAP.

The multimedia stream reader 9 according to an embodiment of the development can also contain other modules (not shown) like a hard disk for the storage of the video fragments, a module for controlling access to the contents, a module for processing the commands received from a remote control, or from a tablet, from a smartphone on which the application for controlling the stream reader 9 is installed, via which the user can control the operation thereof, etc.

In the example in which the stream reader terminal 9 is the HDMI key 8, the latter generally does not contain an I/O interface module, and it is the I/O interface module of the smartphone 3 of the user or of their tablet 4, or of the television 5, that is used by the latter to choose for example their content.

It is noted that the term module can correspond both to a software component and to a hardware component or a set of hardware and software components, a software component itself corresponding to one or more computer programs or subprograms or more generally to any element of a program capable of implementing a function or a set of functions as described for the modules in question. Likewise, a hardware component corresponds to any element of a hardware assembly capable of implementing a function or a set of functions for the module in question (integrated circuit, chip card, memory card, etc.).

More generally, such a stream reader 9 comprises a random-access memory MEM (for example a RAM memory), a processing unit equipped for example with a processor CPU, and controlled by a computer program, and including code instructions representative of the zapping ZAP, selection SEL modules and of the module for managing the HTTP adaptive streaming HAS, stored in a read-only memory (for example a ROM memory or a hard disk). Upon initialization, the code instructions of the computer program are for example loaded into the random-access memory before being executed by the processor CPU of the processing unit. The random-access memory contains in particular the manifest description file 7. The processor of the processing unit controls the selection of an encoding rate of a first time segment of the new content to be downloaded, according to on the one hand a resource constraint obtained by the multimedia stream reader terminal 9 and on the other hand the target zapping time and the emission of corresponding commands to the client module HAS.

Figure 3:
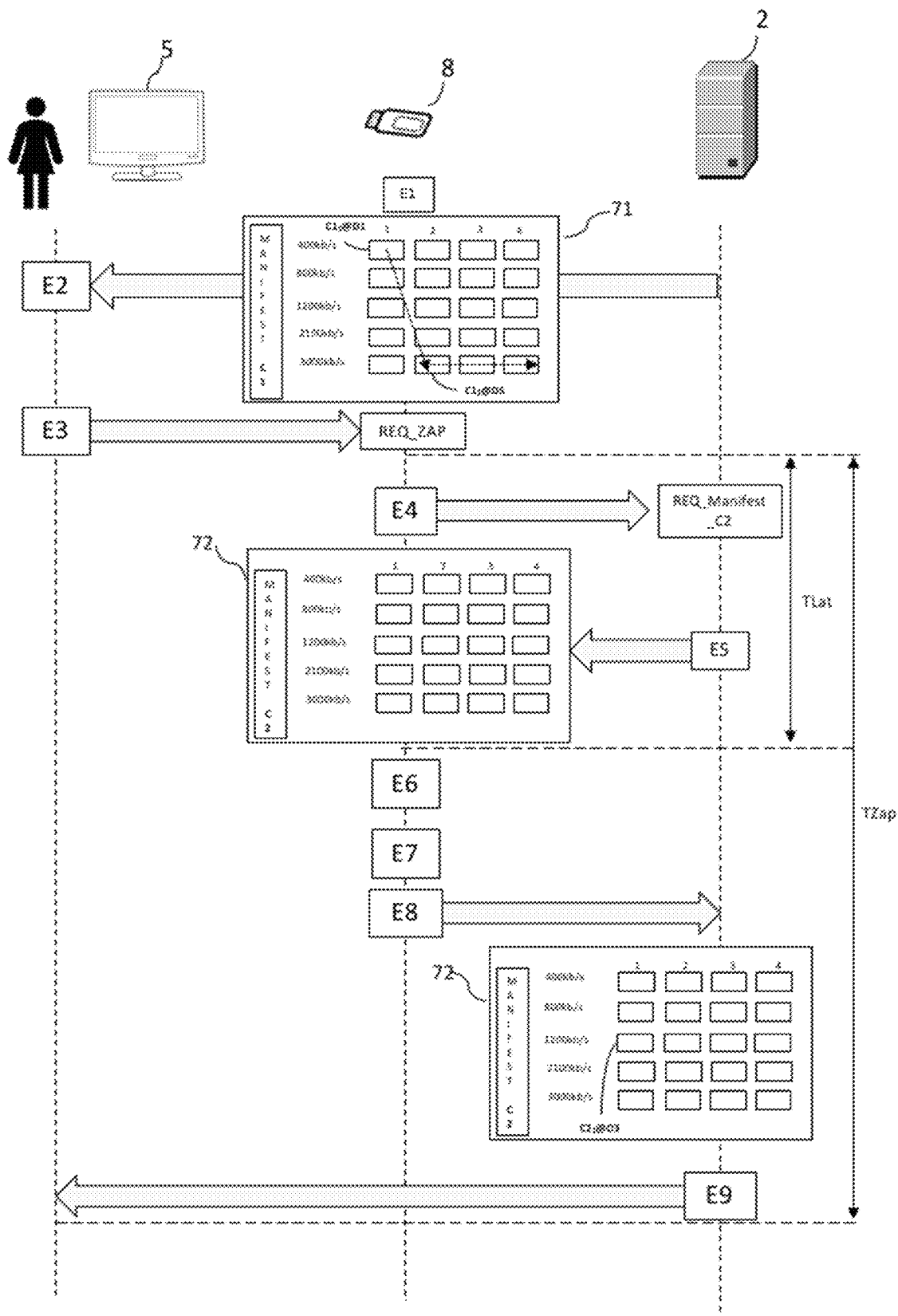
FIG. 3: illustrates an example in the form of a timing chart of implementation of a method for managing zapping from a first to a second digital content by a multimedia stream reader terminal according to FIG. 2, associated with a rendering terminal.

FIG. 2 illustrates only a particular manner, among several possibilities, of carrying out the stream reader terminal 9, in order for it to carry out the steps of the method described in detail below, in relation to FIG. 3 (in any one of the various embodiments, or in a combination of these embodiments). Indeed, these steps can be carried out indifferently on a reprogrammable calculation machine (a PC computer, a DSP processor or a microcontroller) executing a program comprising a sequence of instructions, or on a dedicated calculation machine (for example a set of logic gates like an FPGA or an ASIC, or any other hardware module).

An exemplary embodiment of a method for zapping from a first to a second digital content obtained via HAS downloading, according to an embodiment of the development, will now be described in relation to FIG. 3 in the form of a timing chart.

In this example, the stream reader terminal 9 according to FIG. 2 is the HDMI key 8, which controls the rendering of the multimedia digital content on the associated television 5. The HDMI key 8 thus comprises a selection module SEL, a client module HAS and a zapping module ZAP. The HDMI key 8 can be controlled via a remote control of the television 5 or via a control software application of a smartphone 3 or of a tablet 4.

According to the conventional method of downloading via HAS, before the rendering of a first digital content C1, the user, via the association of the television 5 and of the HDMI key 8, sends a request, which transits through the home gateway 6 (not shown), indicating the chosen content to the "HAS" content server 2.

The "HAS" content server 2 then sends in response to this request a stream of data representative of the chosen content via the home gateway 6 (not shown). The "HAS" content server 2 discloses a digital content C1 in the form of fragments, or chunks $C1i@Dj$ encoded at various encoding rate Dj, where the index i designates a temporal identifier, or position, of the chunk $C1i@Dj$.

According to the prior art, the client module HAS is tasked with retrieving the chunks from the "HAS" content server 2 by choosing the video quality Dj according to the available network resource. The manner in which the client module HAS chooses the encoding rate of the next video fragment to be downloaded is not described here in more detail: there are indeed numerous algorithms allowing to make this choice, the strategies of which are more or less secure or aggressive. It is recalled, however, that most often, the general principle of such algorithms is based on the downloading of a first fragment at the lowest encoding rate proposed in the manifest, and on the evaluation of the time of retrieval of this first fragment. On this basis, the client module HAS evaluates whether, according to the size of the fragment and the time it took to retrieve it, the network conditions allow to download the following fragment at a higher encoding rate. Certain algorithms are based on a progressive increase of the quality level of the content fragments downloaded; others propose riskier approaches, with jumps in the levels of the encoding rates of the successive fragments.

In a conventional case, if a video chunk lasts 4 seconds, the retrieval of the chunk by the module HAS must not exceed 4 seconds, in order to allow a rendering without interruption of the content. The module HAS should therefore carry out the best compromise between a rendering quality, and thus an encoding rate, as high as possible and the download time of the fragment, which must be sufficiently short to allow a continuous rendering on the television 5 for example.

During a step E1, the client module HAS retrieves the manifest file 71 in order to discover the available fragments of the digital content C1, and the various associated video qualities Dj. In this example, the digital content C1 is for example proposed in the form of fragments having a duration of 4 s, with a first encoding rate D1=400 kb/s, a second encoding rate D2=800 kb/s, a third encoding rate D3=1200 kb/s, a fourth encoding rate D4=2100 kb/s and a fifth encoding rate D5=3000 kb/s.

In a conventional operating mode, the client module HAS carries out the downloading for example of the successive fragments $C1_1@D1$ (or the first time fragment at an encoding rate of 400 kb/s), then $C1_2@D5$ (or the second time fragment at an encoding rate of 3000 kb/s), until a reading of a video $C1i@D5$ (or the i-th time fragment at an encoding rate of 3000 kb/s) in normal mode in high quality.

The algorithm implemented by the client module HAS to determine which fragment at which encoding rate must be downloaded in normal operating mode (that is to say outside of the periods in which it is controlled by the selection module SEL) can be one of the already existing algorithms of the prior art. This algorithm will not therefore be described in more detail here.

The various fragments downloaded by the client module HAS are then transmitted in a step E2 to the television 5 via the HDMI key 8 for example for their rendering to the user.

During the viewing of the first digital content C1, for example such as a film, on their television 5 associated with the HDMI key 8, the user can decide at any time to stop their viewing to switch to a new digital content, or second digital content C2.

This is the case for example when the user is currently viewing a film and an advertising break interrupts their film. They can thus decide to zap the ad and watch another digital content, for example on another television channel, while waiting to go back to their film.

Thus, in a step E3, the user emits a command to zap from a first digital content C1 to a second digital content C2. The emission of this command can be carried out either by a movement in a guide of the digital content programs, or by an input of an identifier of the second digital content C2 on a digital keyboard, this identifier comprising at least one alphanumeric character.

The movement in the guide of the programs of digital content can be carried out for example by pressing the buttons provided for this purpose on a remote control of the television 5 (for example such as the buttons P+ or P−) or by swiping the touchscreen of the tablet 4 or of the smartphone 3.

In another example, the zapping command is carried out more directly via the selection of a digital content by input of the identifier of the second content C2 on a digital keyboard. This identifier can be a sequence of alphanumeric characters for example such as the number of the channel or the number of the episode of a series. This input is carried out for example via the remote control of the television 5 or directly on the touchscreen of the smartphone 3 or of the tablet 4.

After this step E3, the zapping module ZAP receives a request REQ_ZAP to zap from the first digital content C1 to a second digital content C2.

In a step E4, the zapping module ZAP, via the client module HAS, sends a request REQ_Manifest_C2, containing a request to retrieve the manifest file 72 of the second digital content C2 to the "HAS" content server 2.

In a step E5, in response to this request, the "HAS" content server 2 sends a stream of data representative of the second chosen digital content C2 to the client module HAS, which thus retrieves the manifest file 72. The "HAS" content server 2 discloses the second digital content C2 in the form of fragments C2$i$@Dj encoded at various encoding rates Dj, where the index i designates a temporal identifier, or position, of the chunk C2$i$@Dj.

After this step E5, a latency That, corresponding to the time that has passed between the emission of the zapping command by the user and the obtaining of the first bytes of the manifest file 72 by the client module HAS, of the second content C2 to be downloaded is measured.

For reasons of simplification, the time of emission of the zapping command by the user will be considered as the time of reception of the zapping request REQ_ZAP by the zapping module ZAP. Thus, the latency That corresponds to the time that passes between the reception of the request REQ_ZAP by the zapping module ZAP and the obtaining of the first bytes of the manifest file 72 by the client module HAS.

This latency That is incompressible and depends on the one hand on the bandwidth at the time of zapping, but also on the time that the "HAS" content server 2 takes to send the manifest file 72 of the second content C2 to the client module HAS.

During a step E6, the client module HAS identifies the available fragments of the digital content C2, and the various associated video qualities Dj. In this example, the digital content C2 is for example proposed in the form of fragments having a duration of 4 s, with a first encoding rate D1=400 kb/s, a second encoding rate D2=800 kb/s, a third encoding rate D3=1200 kb/s, a fourth encoding rate D4=2100 kb/s and a fifth encoding rate D5=3000 kb/s.

In a step E7, the selection module SEL selects an encoding rate of the first time segment of the second digital content C2 (C2$_1$@Dj) to be downloaded, according:
to the available bandwidth at the time of zapping,
to a target zapping time defining a reasonable zapping time ceiling to not be exceeded in order to propose a pleasant experience to the user.

This predefined target zapping time is identical regardless of the bandwidth and resource conditions of the communication network of the user and of the content server 2. In one example, this target zapping time is 2 seconds, a value that guarantees a good user experience in terms of waiting time between the emission of the zapping command and the rendering on the television 5 of the new digital content.

Thus, the encoding rate of the first time segment C2$_1$@Dj of the second digital content C2 is selected in such a way that the zapping time TZap, that is to say the time that passes between the reception of the request REQ_ZAP by the zapping module ZAP and the beginning of the rendering on the television 5 of the second digital content C2, does not exceed the target zapping time, or maximum zapping time. The zapping time TZap also takes into account the latency That measured after step E5.

In an example of selection of the encoding quality of the first segment C2$_1$@Dj of the second content C2, the target zapping time is set to 2 seconds. Thus, the zapping time TZap must be less than or equal to the target zapping time, that is to say 2 seconds, to guarantee a good user experience.

The latency That measured after step E5 is 300 ms.

The bandwidth of the user is measured continuously by the client module HAS. Indeed, the client module HAS knows the current bandwidth constraints, according to the conventional HAS technique. In this example, the bandwidth is measured at 4 Mbs/s.

In the manifest file 72, there are 5 different qualities (D1 to D5) and the time segments have a duration of 4 seconds.

The selection module SEL thus controls the client module HAS to force it to download the first time segment C2$_1$@Dj of the second digital content C2 at the quality Dj allowing to not exceed the predefined target zapping time.

Thus, in our example, the encoding quality Dj at selection for the segment C2$_1$ corresponds to:

Encoding quality of the first segment $(Q) \leq [(\text{Target zapping time} - \text{Latency (That)}) \times \text{bandwidth}]/\text{duration of the segments content } C2$;

or $Q \leq [(2-0.3) \times 4]/4$;

or $Q \leq 1.7$ Mbs/s.

The selection module SEL thus selects the quality D3 of 1200 kbs/s in such a way that the zapping time TZap is less than or equal to the target zapping time of 2 seconds.

In one embodiment of the development, the target zapping time results from a choice expressed by a user via an I/O interface of a rendering terminal, for example such as the television 5. In one example, the user can, via the I/O interface of the television 5, select either the target zapping time predefined by the manufacturer (for example 2 seconds), or modify it according to their preferences.

In a first example, the user can select a shorter target zapping time (for example 1 second) and thus favor the downloading of the first time segment of the second digital content C2 at a lesser quality (for example 400 kbs/s C2$_1$@D1).

In a second example, the user can choose a longer target zapping time (for example 4 seconds), in order to favor the selection of the first time segment of the second digital content C2 at a better quality (for example the segment at 3000 kbs/s C2$_1$@D5).

In another embodiment, the choice expressed by the user depends on a nature of a digital content.

In one example, the user can choose according to the nature of the digital content (for example film, documentary, sport . . . ) the target zapping time. In other words, when the user has a particular interest for a content of a certain nature, for example such as a film, they can choose a longer target zapping time in order to ensure that the best content quality is downloaded. On the contrary, when the quality of the content only has little interest for the user (for example television news), they can thus prefer a shorter zapping time and therefore download the new content at a low encoding rate.

In another alternative embodiment, the target zapping time is set by the manufacturer of the multimedia stream reader terminal according to the nature of the digital content (for example 2 seconds for a digital content in real time, and 4 seconds for a delayed digital content, for example a video on demand).

In a step E8, the client module HAS, controlled by the selection module SEL, is tasked with retrieving the time segments from the "HAS" content server 2 by choosing the video quality D3 imposed according to the available network resource and the target zapping time.

In a step E9, the client module HAS renders the first fragment C2$_1$@D3 in the television 5.

The next fragments are then downloaded and rendered according to the conventional technique of HAS downloading.

The method according to the development thus allows to optimize the quality of encoding of the second digital content C2 to be rendered, to favor the best possible quality of experience, without affecting the zapping time, since the latter is limited by a target zapping time to not be exceeded.

APPENDIX 1 example of a manifest file

```xml
<?xml version="1.0"?>
<MPD xmlns:xsi="http://www.w3.org/2001/XMLSchema-instance"
  xmlns="urn:mpeg:DASH:schema:MPD:2011"
  xsi:schemaLocation="urn:mpeg:DASH:schema:MPD:2011 DASH-MPD.xsd"
  type="dynamic"  profiles="urn:mpeg:dash:profile:isoff-live:2011">
<Representation id="0" codecs="avc1" mimeType="video/mp4"
width="1024" height="768" startWithSAP="1" bandwidth="46986">
<BaseURL>HTTP://server.com/</BaseURL>
<!-- Contenu C1 à N1=512kb -->
<SegmentBase>
    <Initialization sourceURL="C1_15sec_512kb/C1_512kbit_dash.mp4"/>
</SegmentBase>
<SegmentList duration="10">
    <SegmentURL media="C1_512kb_1.mp4"/>
    <SegmentURL media=" C1_512kb _2.mp4"/> ....
</SegmentList>
<!-- Contenu C1 à N2=1024kb -->
<SegmentBase>
    <Initialization sourceURL="C1_15sec_500kbit/C1_1024kbit_dash.mp4"/>
</SegmentBase>
<SegmentList duration="10">
    <SegmentURL media="C1_512kb_1.mp4"/>....
</SegmentList>
<!-- Contenu C1 à N3=2048kb -->
<SegmentBase>
    <Initialization sourceURL="C1_15sec_512kb /C1_2048kbit_dash.mp4"/>
</SegmentBase>
<SegmentList duration="10">
    <SegmentURL media="C1_2048kb_1.mp4"/>...
</SegmentList>
<!-- Contenu C2 à N1=512kb -->
<SegmentBase>
    <Initialization sourceURL=" C2_15sec_500kbit/C2_512kbit_dash.mp4"/>
</SegmentBase>
<SegmentList duration="10">
    <SegmentURL media=" C2_512kb_1.mp4"/> ....
</SegmentList>
<!-- Contenu C2 à N2=1024kb -->
<SegmentBase>
    <Initialization sourceURL="C2_15sec_500kbit/C1_1024kbit_dash.mp4"/>
</SegmentBase>
<SegmentList duration="10">
    <SegmentURL media="C2_1024kb_1.mp4"/>....
</SegmentList>
<!-- Contenu C2 à N3=2048kb -->
<SegmentBase>
    <Initialization sourceURL="C2_15sec_500kbit/C1_2048kbit_dash.mp4"/>
</SegmentBase>
<SegmentList duration="10">
    <SegmentURL media="C1_2048kbit_1.mp4"/>...
</SegmentList>
    ....
</SegmentList>
</MPD>
```

The invention claimed is:

1. A method of managing zapping from a first to a second digital content,
the first and second digital contents being obtained by HTTP adaptive streaming by a multimedia stream reader terminal,
the first and second digital contents being respectively associated with a description file, comprising a list of time segments of the content each associated with several encoding rates of the content,
the method comprising:
receiving a request to zap from the first digital content to the second digital content;
obtaining the description file of the second digital content;
selecting an encoding rate of a first time segment of the second digital content to be downloaded, according to at least one of a resource constraint obtained by the multimedia stream reader terminal and a target zapping time; and
downloading the first time segment of the second digital content at the selected rate.

2. The method of managing zapping according to claim 1, wherein the selected encoding rate corresponds to an encoding rate for which a zapping time from the first to the second content is less than or equal to the target zapping time.

3. The method of managing zapping according to claim 2, wherein the selection of an encoding rate takes into account a latency necessary for the obtaining of the description file of the second digital content.

4. The method of managing zapping according to claim 1, wherein the zapping request belongs to the group comprising:
a movement in a guide of the digital content programs; and an input of an identifier of the second digital content on a digital keyboard, the identifier comprising at least one alphanumeric character.

5. The method of managing zapping according to claim 1, additionally comprising parameterizing of the target zapping time by a user via an interface of a rendering terminal.

6. The method of managing zapping according to claim 1, wherein the target zapping time depends on a nature of the second digital content.

7. A processing circuit comprising a processor and a memory, the memory storing program code instructions of a computer program for implementation of a method for a changing of digital content obtained by HTTP adaptive streaming by the multimedia stream reader terminal according to claim 1, when the program is executed by the processor.

8. A non-transitory computer-readable storage medium on which the computer program according to claim 7 is recorded.

9. A device for managing zapping from a first to a second digital content,
the first and second digital contents being obtained by HTTP adaptive streaming by a multimedia stream reader terminal,
the first and second digital contents being respectively associated with a description file, comprising a list of time segments of the content each associated with several encoding rates of the content,
the device comprising:
  a receiving module configured to receive a request to zap from the first digital content to the second digital content;
  an obtaining module configured to obtain the description file of the second digital content;
  a selecting module configured to select an encoding rate of a first time segment of the second digital content to be downloaded, according to at least one of a resource constraint obtained by the multimedia stream reader terminal and a target zapping time; and
  a downloading module configured to download the first time segment of the second digital content at the selected rate.

10. A multimedia stream reader terminal, comprising the device for managing zapping according to claim 9.

* * * * *